United States Patent Office 3,798,205
Patented Mar. 19, 1974

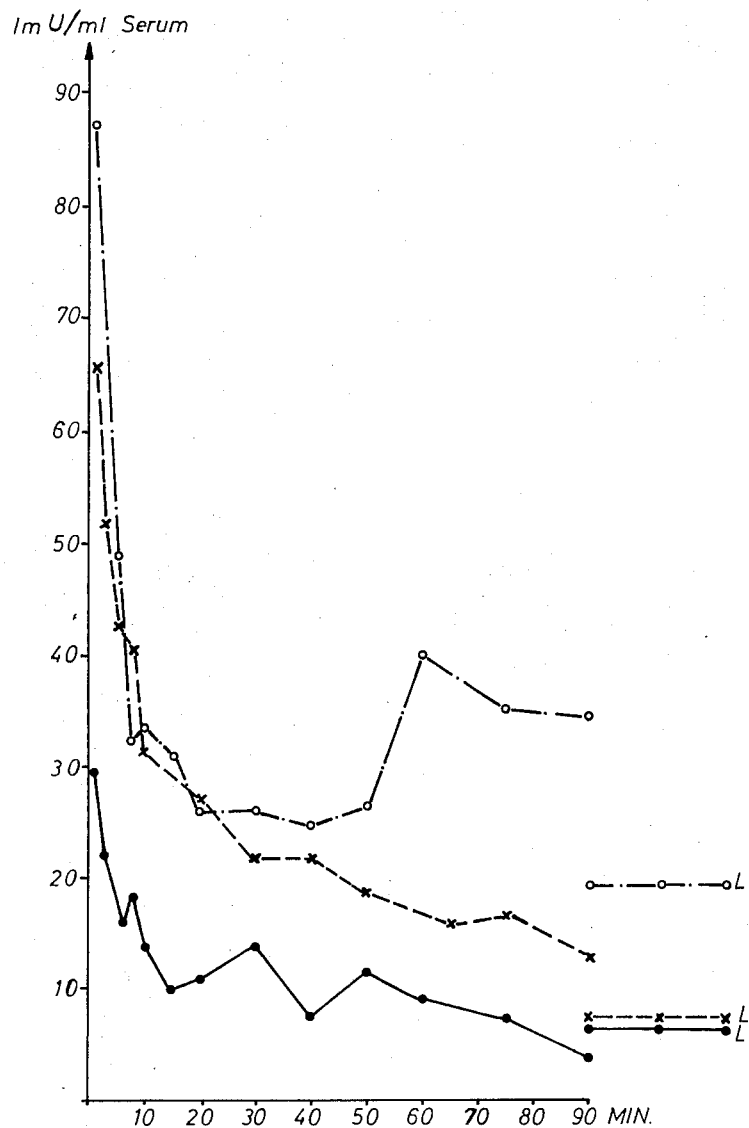

3,798,205
DERIVATIVES OF THE KALLIKREIN INHIBITOR AND THEIR PRODUCTION
Eugen Werle and Hans Fritz, Munich, Germany, assignors to Bayer Aktiengesellschaft, Leverkusen, Germany
Continuation of abandoned application Ser. No. 743,889, July 10, 1968. This application Nov. 5, 1971, Ser. No. 196,232
Claims priority, application Germany, July 26, 1967, F 53,061
Int. Cl. C07c *103/52;* C07g *7/00;* C08h *1/00*
U.S. Cl. 260—112.5                    5 Claims

ABSTRACT OF THE DISCLOSURE

Novel derivatives of the kallikrein inactivator are provided which are polypeptidyl-kallikrein inhibitors or polypeptidyl-polykallikrein inhibitors. These are useful in the therapy and prophylaxis of pancreatitis, some form of shock and the treatment of hyperfibrinolytic bleeding. They are produced by reacting the kallikrein inactivator with an N-carboxy-anhydride of an α-amino acid in solution at a temperature of −5° C. to +15° C.

---

This is a continuation of application Ser. No. 743,889 filed July 10, 1968, now abandoned.

The present invention relates to new and useful derivatives of the kallikrein inactivator primarily useful in the prophylaxis and therapy of pancreatitis, some froms of shock and the treatment of hyperfibrinolytic bleeding and to the production of such derivatives by reacting the kallikrein inhibitor with any one of a variety of N-carboxy-anhydrides of an α-amino acid in solution at a temperature of −5° C. to +15° C.

The kallikrein inhibitor is itself well known and has been widely used in the treatment of pancreatitis. This substance, however, does not have some special particularly desirable or effective properties and hence numerous attempts have been made to modify the kallikrein inhibitor to improve its effectiveness. These attempts have been directed toward obtaining a longer residence time in the blood as compared to the unmodified kallikrein inhibitor, the retention thereof in certain organs of the body preferentially and also to the formation of antibodies other than those produced by the unmodified kallikrein inhibitor. These prior attempts have not yielded any satisfactory results or any material improvement either in the substance itself or in the activity and effectiveness thereof. This is true despite the fact that the literature discloses procedures wherein N-carboxy-anhydrides of amino acids have been reacted with enzymes such as trypsin, ribonuclease and lysozyme. [Sela et al., Biochem. J. 85, 223, 1962; Biochem. Biophys. Acta 62, 594, 1962; Biochem. J. 93, 566, 1964; Yaron and Berger, Biochim. Biophys. Acta 107, 307, 1965; Frensdorff et al., European J. Biochem. 1, 267 and 281, 1967; Polyamino Acids, Polypeptides and Proteins, Stahmann, M. A., ed. U. of Wisc. Press, Madison, Wis., 1962; Biological Properties of Poly-α-Amino Acids, Silman, H. I., and Sela, M. in "Poly-α-Amino Acids as Protein Models for Conformational Studies," Fasman, G. D., ed., p. 605, Marcel Decker, Inc., New York, 1967.]

The kallikrein inhibitor has, however, not heretofore been reacted with N-carboxy-anhydrides of amino acids.

According to the present invention it has now been found that new and valuable derivatives of the kallikrein inhibitor can be obtained by reacting the kallikrein inhibitor in solution at −5° C. to +15° C. with an N-carboxy-anhydride of a wide variety of amino acids and that the reaction products thus resulting are polypeptidyl-kallikrein inhibitors or polypeptidyl-polykallikrein inhibitors which have very satisfactory residence time in the blood and other desirable properties not heretofore obtainable as illustrated in the accompanying graphic drawing. These new derivatives have all the desirable properties which have heretofore been sought without success and which are referred to above.

The starting products which are suitable for carrying out the procedure are per se known kallikrein inhibitors, for example, the kallikrein inhibitor known by the trade name Trasylol and which is capable also of inhibiting trypsin, chymotrypsin and plasmin. The process is carried out in aqueous solution at a pH range of 5 to 9, preferably 7 to 9, with or without the use of an organic solvent capable of dissolving the kallikrein inhibitor such as dimethyl sulphoxide. The reaction is subjected to cooling to control its temperature within the range of −5° C. to +15° C. and while some temperature variation is permissible, the practical and suitable temperature range has been found to be at −5° C. to +15° C.

N-carboxy-anhydrides of amino acids suitable for use in the invention are the N-carboxy-anhydrides of the following amino acids which are intended as illustrative and not as an exhaustive list: glycine, alanine, leucine, isoleucine, valine, tyrosine, phenylalanine, lysine, arginine, serine, threonine, cystine, cysteinic acid, lanthionine, djenkolic acid, methionine, ornithine, citrulline, aspartic acid, glutamic acid, histidine, tryptophane, glutamine, asparagine, α,α′-diamino-pimelic acid and α,α′-diamino-glutaric acid.

The new kallikrein inhibitor derivatives are administered generally in the same manner and at the same dosage level and frequency as the known kallikrein inhibitors themselves and for the same pathological indications.

The invention is further illustrated by the following non-limitative example.

EXAMPLE (1) Preparation of polyglutamyl-kallikrein inhibitors 150 mg. of kallikrein inhibitor and 150 mg. of magnesium sulphate were dissolved in 10 ml. of 0.025 N HCl. 10 ml. of 0.1 M potassium phosphate buffer were added to this solution at pH 7.6 and the mixture was cooled to 0° C. There was added dropwise, while stirring, the N-carboxy-anhydride of glutamic acid (prepared from 15 g. of L-glutamic acid, prepared with phosgene, anhydride yield moderate). The milky turbid mixture was stirred overnight in a refrigerator. It was then centrifuged off from the water-insoluble oil and the reaction solution then poured through a Sephadex-G-25-column equilibrated with 0.01 M acetic acid. After lyophilizing the kallikrein-inhibiting fractions, 133 mg. of a loose, salt-free powder, were obtained.

Properties.—The polyglutamyl-kallikrein inhibitors obtained inhibit the enzymes trypsin, chymotrypsin, kallikrein and plasmin in the same proportion as the unmodified kallikrein inhibitor. The unmodified kallikrein inhibitor contains 3 glutamic acid residues per molecule. (F. A. Anderer and S. Hoernle, Z, Naturforsch. 206, 457, 1965.) The polyglutamyl-kallikrein inhibitors contain additional glutamic acid residues per molecule inhibitor, linked with the N-termnal amino group of the inhibitor, and ε-amino groups of lysyl residues, the number of which depends upon the excess of the N-carboxy-anhydride of glutamic acid used in the initial mixture.

In the present example, inhibitor fractions containing up to 10 additional glutamic acid residues per molecule were found. The molecular weight of the kallikrein inhibitor increases by 130 per each additional glutamic acid residue. Poly-glutamyl-kallikrein inhibitor containing 10 additional glutamic acid residues consequently possesses a molecular weight of 7813 (the molecular weight of the kallikrein inhibitor used is 6513). The mixture of the polyglutamyl-kallikrein inhibitors can be separated by electrophoresis (e.g. in 0.01 M veronal buffer at pH 9 and 400 v. on cellulose acetate membranes) into the individual polyglutamyl-kallikrein inhibitors each having a defined content of glutamic acid residues, since every additionally bound glutamic acid residue brings about, due to its free β-carboxyl group, a marked shift of the effective total charge of the molecule, i.e. the isoelectric point of the strongly basic kallikrein inhibitor (at 10.5) is further shifted to the neutral or acidic side by each additionally bound glutamic acid residue. The resultant polyglutamyl kallikrein inhibitors are thus a mixture of electrophoretically separable kallikrein inhibitors which differ from each other by their varying content of covalent-bound glutamic acid.

(2) Preparation of polyseryl-kallikrein inhibitors

The N-carboxy-anhydride of serine was prepared from 15 g. serine and phosgene according to known methods. 100 mg. of kallikrein inhibitor and 100 ml. of magnesium sulphate were dissolved in 3.6 ml. of 0.0025 N hydrochloric acid, the solution was mixed with 3.6 ml. of 0.1 M potassium phosphate buffer (pH 7.6) and cooled to 0° C. The N-carboxy-anhydride of serine, dissolved in 2.5 ml. of dioxan, was added dropwise thereto with intensive stirring. The milky turbid mixture was stirred overnight in a refrigerator, then centrifuged and the clear supernatant layer was filtered through a Sephadex-G-25-column (120 x 3.5 cm.) equilibrated with 0.01 N acetic acid. After lyophilizing the kallikrein-inhibiting fractions, 110 mg. of a friable white powder were obtained.

Properties.—The polyseryl-kallikrein inhibitors obtained inhibit the enzymes trypsin, chymotrypsin, kallikrein and plasmin in the same proportion as the unmodified kallikrein inhibitor. The kallikrein inhibitor contains 1 serine residue per molecule. The isolated polyseryl-kallikrein inhibitors contain up to 12 seryl residues per molecule. Under suitable conditions (higher anhydride excess in the initial mixture), polyseryl-kallikrein inhibitors of an even higher serine content can be obtained. In the electrophoresis (conditions as in the polyglutamyl example) the polyseryl-kallikreins show no resolution into individual zones, but their rate of migration towards the cathode (IP below 9.5) is less than that of the unmodified kallikrein inhibitor (IP above 10.5).

Experiments on dogs of distributing polypeptidyl-kallikrein inhibitors after i.v. injection.—Dogs of comparable size were injected each with 30,000 ImU (corresponding to an inhibition of about 30 mg. of trypsin) of polypeptidyl-kallikrein inhibitors (Examples 1 and 2) as well as of unmodified kallikrein inhibitor. The inhibitor concentration was determined in the blood after varying periods of time. The resultant values are graphically illustrated in FIG. 1. In this figure, the fully drawn line represents the unmodified inhibitor, the dotted line denotes the polyseryl-kallikrein inhibitor and the broken line means polyglutamyl-kallikrein inhibitor after injection of 30,000 ImU from each inhibitor. L designates the inhibitor blank value of the serum in each case.

Furthermore, the organs of the dogs were extirpated each after 90 minutes and examined for their inhibitor content (Table 1).

Table 1 shows that the inhibitor concentration of the polypeptidyl-kallikrein inhibitors in the organs, especially in the kidney, is substantially lower than that of the unmodified kallikrein inhibitor. The concentrations of the polypeptidyl-kallikrein inhibitors in the blood are accordingly substantially higher than those of the unmodified inhibitor (FIG. 1): the polypeptidyl-kallikrein inhibitors are considerably more slowly eliminated from the blood by the kidneys than the unmodified kallikrein inhibitor.

TABLE 1

| | Kallikrein inhibitor | Polyseryl-kallikrein inhibitor | Polyglutamyl-kallikrein inhibitor |
|---|---|---|---|
| Kidneys | 20,000 | 16,400 | 12,000 |
| Liver | 2,900 | 2,200 | 1,800 |
| Lungs | 820 | 570 | 400 |
| Spleen | 440 | 190 | 300 |

The figures mean mU trypsin in these organs.

Trasylol® inhibits the proteolytic enzymes pathologically released in pancreatitis; it also inhibits kallikrein and therefore the release of the kinins responsible for shock; the inhibition of plasmin prevents hyperfibrinolytic bleeding. Its generic name is aprotinin.

What is claimed is:

1. A polypeptidyl-kallikrein inhibitor having α-amino acid residues linked with the N-terminal amino group and with ε-amino groups of lysyl residues of the kallikrein inhibitor prepared by the process comprising reacting phosgene with an α-amino acid to form a reaction product containing an N-carboxy anhydride of said α-amino acid, adding said reaction product to an aqueous solution of bovine kallikrein inhibitor having a pH of from 5 to 9 in the weight ratio of said reaction product to kallikrein inhibitor of from 100:1 to 150:1, reacting said reaction product with said kallikrein inhibitor while maintaining the reaction temperature in the range of from −5° C. to +15° C., and recovering said polypeptidyl-kallikrein inhibitor.

2. The polypeptidyl-kallikrein inhibitor of claim 1, wherein the α-amino acid is glycine, alanine, leucine, isoleucine, valine, tyrosin,e phenylalanine, lysine, arginine, serine, threonine, cystine, cysteinic acid, lanthionine, djenkolic acid, methionine, ornithine, citrulline, aspartic acid, glutamic acid, histidine, tryptophane, glutamine, asparagine, α,α'-diaminopimelic acid or α,α'-diaminoglutaric acid.

3. The polypeptidyl-kallikrein inhibitor of claim 1, in which the α-amino acid is glutamic acid and the polypeptidyl-kallikrein inhibitor recovered is a mixture of polyglutamyl-kallikrein inhibitors having not more than 10 additional glutamic acid residues per molecule.

4. The polypeptidyl-kallikrein inhibitor of claim 3, containing 10 additional glutamic acid residues and having a molecular weight of 7813.

5. The polypeptidyl-kallikrein inhibitor of claim 1, in which the α-amino acid is serine and the polypeptidyl-kallikrein inhibitor recovered is a mixture of polyseryl-kallikrein inhibitors having not more than 11 additional serine residues per molecule.

References Cited

UNITED STATES PATENTS 3,243,356   3/1966   Kirimura et al. ____ 260—112.5

FOREIGN PATENTS 6613752   3/1967   Netherlands _____ 260—112.5

OTHER REFERENCES

Chauvet et al.: Biochem. Biophys. Res. Comm., 27, 230 (1967).
aKssell et al.: Biochem., 5, 3449 (1966).
Stahmann et al.: Uature, 184, 549 (1959).
Stracher et al.: J. Am. Chem. Soc., 81, 1432 (1959).
Tsuyuki, et al.: J. Am. Chem. Soc. 78, 764 (1956).

LEWIS GOTT, Primary Examiner

R. J. SUYAT, Assistant Examiner

U.S. Cl. X.R.

424—177